(12) United States Patent
Ma et al.

(10) Patent No.: US 12,059,802 B2
(45) Date of Patent: Aug. 13, 2024

(54) ELECTRICALLY-ACTUATED ARTIFICIAL MUSCLE FIBER WITH BIDIRECTIONAL LINEAR STRAIN AND PREPARATION METHOD THEREOF

(71) Applicant: Zhejiang Lab, Zhejiang (CN)

(72) Inventors: Zhijun Ma, Zhejiang (CN); Hengyi Li, Zhejiang (CN); Yiming Liang, Zhejiang (CN); Ruixiang Qu, Zhejiang (CN); Yuan Qi, Zhejiang (CN); Xiangling Tian, Zhejiang (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/410,566

(22) Filed: Jan. 11, 2024

(65) Prior Publication Data

US 2024/0198511 A1 Jun. 20, 2024

Related U.S. Application Data

(63) Continuation of application No. PCT/CN2023/114906, filed on Aug. 25, 2023.

(30) Foreign Application Priority Data

Dec. 15, 2022 (CN) .......................... 202211612204.1

(51) Int. Cl.
*B25J 9/00* (2006.01)
*D06M 11/74* (2006.01)
(Continued)

(52) U.S. Cl.
CPC ............ *B25J 9/0015* (2013.01); *D06M 11/74* (2013.01); *D06M 11/83* (2013.01);
(Continued)

(58) Field of Classification Search
CPC ...... B25J 9/0015; D06M 11/74; D06M 11/83; D06M 15/256; D06M 2101/20;
(Continued)

(56) References Cited

U.S. PATENT DOCUMENTS

| 2008/0170982 A1* | 7/2008 | Zhang ............... C04B 35/62855 |
| | | 423/447.3 |
| 2012/0100203 A1* | 4/2012 | Fang ........................ D01F 9/12 |
| | | 423/580.1 |

(Continued)

FOREIGN PATENT DOCUMENTS

| CN | 109572966 A | 4/2019 |
| CN | 110100384 A | 8/2019 |

(Continued)

OTHER PUBLICATIONS

Wang Yulian et al., "Recent Progress in Artificial Muscles Fibers," Materials Reports, 2021, vol. 35, No. 1.
(Continued)

*Primary Examiner* — Daniel C. McCracken
(74) *Attorney, Agent, or Firm* — Piloff Passino & Cosenza LLP; Rachel K. Piloff; Sean A. Passino

(57) ABSTRACT

An electrically-actuated artificial muscle fiber with bidirectional linear strain and a preparation method thereof are provided. The artificial muscle fiber includes a fiber matrix, electrode layers and insulating layers. The artificial muscle fiber takes the fiber matrix as a skeleton, upper and lower layers of the fiber matrix are covered with one electrode layer respectively, and one insulating layer is covered on a surface of each of electrode layers. A helical fiber body is formed by winding. Finally, the artificial muscle fiber is formed through packaging, where metal wires are taken as leads and respectively connected to upper and lower layers of electrodes.

12 Claims, 3 Drawing Sheets

(51) Int. Cl.
  *D06M 11/83*  (2006.01)
  *D06M 15/256* (2006.01)
  *D06M 101/20* (2006.01)
  *D06M 101/24* (2006.01)
  *D06M 101/26* (2006.01)
  *D06M 101/30* (2006.01)

(52) U.S. Cl.
  CPC ...... *D06M 15/256* (2013.01); *D06M 2101/20* (2013.01); *D06M 2101/24* (2013.01); *D06M 2101/26* (2013.01); *D06M 2101/30* (2013.01)

(58) Field of Classification Search
  CPC ......... D06M 2101/24; D06M 2101/26; D06M 2101/30; C01B 32/158; C01B 32/159; C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

U.S. PATENT DOCUMENTS

| 2015/0152852 | A1* | 6/2015 | Li | D04C 1/02 60/527 |
|---|---|---|---|---|
| 2016/0206420 | A1 | 7/2016 | Yun et al. | |
| 2018/0291535 | A1* | 10/2018 | Ridley | D02G 3/406 |
| 2020/0161989 | A1 | 5/2020 | Nakamaru et al. | |
| 2020/0208614 | A1* | 7/2020 | Baughman | F03G 7/005 |
| 2020/0345475 | A1* | 11/2020 | Lima | D02G 3/448 |

FOREIGN PATENT DOCUMENTS

| CN | 112936250 | A | 6/2021 |
| CN | 113119088 | A | 7/2021 |
| CN | 114246977 | A | 3/2022 |
| CN | 217097786 | U | 8/2022 |
| CN | 115142267 | A | 10/2022 |
| CN | 115890643 | A | 4/2023 |
| JP | 2003218417 | A | 7/2003 |
| KR | 20060107259 | A | 10/2006 |

OTHER PUBLICATIONS

First Office Action for China Application No. 202211612204.1, mailed Jul. 14, 2023.
Notification to Grant Patent for China Application No. 202211612204.1, mailed Jul. 28, 2023.
International Search Report for PCT/CN2023/114906, mailed Oct. 21, 2023.

* cited by examiner

ELECTRICALLY-ACTUATED ARTIFICIAL MUSCLE FIBER WITH BIDIRECTIONAL LINEAR STRAIN AND PREPARATION METHOD THEREOF

CROSS-REFERENCE TO RELATED APPLICATIONS

This application is a continuation of PCT/CN2023/114906, filed on Aug. 25, 2023, and claims priority of Chinese Patent Application No. 202211612204.1, filed on Dec. 15, 2022, the entire contents of which are incorporated herein by reference.

TECHNICAL FIELD

The application belongs to the technical field of artificial muscle materials, and in particular to an electrically-actuated artificial muscle fiber with bidirectional linear strain and preparation method thereof.

BACKGROUND

Artificial muscle refers to a kind of flexible materials and devices that are capable of generating a series of basic movements, such as reversible contraction, expansion, bending and rotation under external physical or chemical stimulations. Compared with the traditional rigid actuators such as motors and hinges, the artificial muscle is characterized by its softness and flexibility, is capable of bearing large strain in the form of continuous deformation, has a high degree of freedom, and may change its shape according to actual needs. The artificial muscle has broad application prospects in the fields of flexible robot manufacturing, medical services, deep-sea exploration, military reconnaissance and so on.

In fact, the large-scale application of artificial muscle requires the construction of modular and integrated artificial muscle devices, so it is more practical to prepare artificial muscle materials into fibers. The current fiber-based artificial muscles, which can generate torsional and linear locomotions, rely primarily on polymer fiber twisting technology. The actuation stimuli for these muscles typically include heat, humidity, and electrochemistry, among others. Upon actuation stimuli, the coiled fibers undergo volumetric expansion in diameter and shrink in length, causing the twisting structure to contract and rotate reversibly to achieve actuation: for example, Baughman et al. (Mu J, Jung de Andrade M, Fang S, Et al. Sheath-run Artificial Muscles [J]. Science, 2019, 365 (6449): 150155.) reported that artificial muscle fibers actuated by sheath structure may reversibly contract by absorbing and releasing ethanol vapor, and the strain may reach 8.5% at the actuation frequency of 0.1 Hz. Patent CN112391831A discloses a thermally actuated artificial muscle fiber prepared by twisting carbon nanotube film, where the fiber contracts when the temperature increases, and the fiber returns to its original length after the temperature decreases. This kind of polymer twisting method is simple to realize, and the active actuation mode is mainly contraction. However, due to the limitation of ion diffusion rate or cooling rate, the actuation frequency is low (generally, the effective actuation is in the magnitude of 0.01-10 Hz). Although a few reported artificial muscle fibers made of dielectric elastomer may achieve high actuation frequency (in the magnitude of 1-100 Hz), they are capable of only being actively actuated in a single direction under applied voltage, and they passively restored to initial length due to the inherent elasticity of the material after the voltage is removed, which greatly limits the application range of artificial muscle fibers. Moreover, the reported fibers exhibit a linear morphology, and the value of actuation strain is relatively low. For example, David R. Clarke et al. (Khortos A, Mao J, Mueller J, et al. Printing Reconfigurable Bundles of Dielectric Elastomer Fibers [J]. Advanced Functional Materials, 2021, 31 (22): 2010643.) reported that under the Maxwell stress of electric field, the fiber sheath compressed to realize the active actuation of axial elongation, and only about 3% strain was obtained at 8 KV voltage. The linear muscle fiber disclosed in patent CN114246977A expands radially under the action of voltage, and only realizes the active actuation of axial contraction.

The above-mentioned prior art research shows the shortcomings of single active actuation mode of artificial muscle fiber (The locomotion is generated in a single direction only under applied voltage, and then the artificial muscle fiber passively returns to initial length by the elasticity of the material itself after the voltage is removed) and small actuation strain caused by linear morphology, which greatly limits the practical application and development of artificial muscle fiber.

SUMMARY

The application aims at overcoming the shortcomings of the prior art, and provides an artificial muscle fiber actuated by an electric field, which is capable of responding at high frequency, realize two actuation modes of active elongation and active contraction under the electric field with one single fiber actuator, and has the electric self-healing ability, and a preparation method thereof. The preparation method disclosed by the application is capable of realizing the layer-by-layer manufacturing and assembly of the fiber functional layer, is compatible with printing preparation processes such as circuits, and has higher accuracy and operability.

The objective of the application is achieved through the following technical scheme. An electrically-actuated artificial muscle fiber with bidirectional linear strain includes leads, an electrical packaging structure, a fiber matrix, electrode layers and insulating layers. The artificial muscle fiber takes the fiber matrix as a skeleton. The upper layer and the lower layer of fiber matrix are covered with one electrode layer respectively. One insulating layer is covered on the surface of each of electrode layers. The helical fiber body is formed by winding. Finally, the artificial muscle fiber is formed through packaging by the electrical packaging structure, where metal wires are taken as the leads and respectively connected to the upper and lower layers of electrodes.

Voltages with different signs are applied between the upper and lower layers of electrodes or one of layers of electrodes is grounded while the other layer of electrode is applied with a voltage with arbitrary signs, and the artificial muscle fiber realizes active contraction actuation.

Voltages with same signs are applied between the upper and lower layers of electrodes, and the artificial muscle fiber realizes active elongation actuation.

Optionally, the packaging is to package one or more helical fiber bodies. The helical fiber bodies are connected in series or/and in parallel.

Optionally, one of dielectric fluid, hydrogel, oil gel and air is filled in the electrical packaging structure. The dielectric fluid includes transformer oil, castor oil and rapeseed oil. When transformer oil, castor oil and rapeseed oil are used for packaging, thermoplastic elastomer film, silicone rubber film and natural rubber film are used for cladding. The liquid content of the hydrogel or oil gel is 1.0%-99.9%.

The fiber matrix material and insulating layer materials both include one or more of polyvinylidene fluoride, polyethylene, polypropylene, polycarbonate, polymethyl methacrylate, polyamide, polyimide, natural rubber, thermoplastic elastomer, silicone rubber, styrene-butadiene rubber, glass and quartz.

The electrode layers are flexible electrodes, including one or more of metal nanowires, carbon nanotubes, graphene, conductive silver paste, conductive carbon grease, liquid metal, gel electrodes, copper foils, conductive adhesive tapes and metal conductive wires.

Optionally, the voltages range from −20 kilovolts (KV) to +20 KV.

Optionally, the Young's modulus of the fiber matrix as skeleton is between 0.1 megapascal (MPa) and 10 gigapascals (GPa).

The thickness of each of electrode layers is between 0.01 and 1000 micrometres (μm).

The thickness of each of insulating layers is between 1 and 100 μm.

The pitch of the helical fiber body is between 0.01 and 10 millimeters (mm).

A preparation method of an electrically-actuated artificial muscle fiber with bidirectional linear strain includes following steps:
S1, compounding electrode layers on both sides of a fiber matrix to obtain a composite material A;
S2, compounding insulating layer materials on both sides of the composite material A obtained in the S1 to obtain a composite material B;
S3, cutting or melt-drawing the composite material B obtained in the S2 to obtain straight-strip fibrous samples C;
S4, winding the straight-strip fibrous samples C in the S3 on a template to obtain helical fiber samples D;
S5, performing thermal annealing or annealing with solvent on the helical fiber samples D obtained in the S4 to fix the helical fiber samples D; and
S6, packaging the helical fiber samples D obtained in the S5 and externally connecting electrodes, and finally obtaining the helical self-healing artificial muscle fiber E capable of realizing elongation and contraction actuation at the same time.

Optionally, one of dielectric fluid, hydrogel, oil gel and air is filled in the packaging structure. The dielectric fluid includes transformer oil, castor oil and rapeseed oil. When transformer oil, castor oil and rapeseed oil are used for packaging, thermoplastic elastomer film, silicone rubber film and natural rubber film are used for cladding. The liquid content of the hydrogel or oil gel is 1.0%-99.9%.

The fiber matrix material and insulating layer materials both include one or more of polyvinylidene fluoride, polyethylene, polypropylene, polycarbonate, polymethyl methacrylate, polyamide, polyimide, natural rubber, thermoplastic elastomer, silicone rubber, styrene-butadiene rubber, glass and quartz.

The electrode layers are flexible electrodes, including one or more of metal nanowires, carbon nanotubes, graphene, conductive silver paste, conductive carbon grease, liquid metal, gel electrodes, copper foils, conductive adhesive tapes and metal conductive wires.

Optionally, the electrode layers may be compounded with the fiber matrix by manual coating, dipping and pulling, and inkjet printing by a circuit printer.

Each of insulating layers is compound with and wraps corresponding one of electrode layers by interfacial polymerization, solution film scraping, hot pressing film forming and dipping and pulling.

The packaging is to package one or more helical fiber samples D. The helical fiber samples D are connected in series or/and in parallel.

Optionally, the voltages of the artificial muscle fiber E range from −20 KV to +20 KV.

Optionally, the Young's modulus of the fiber matrix material is between 0.1 MPa and 10 GPa.

The thickness of each of electrode layers is between 0.01 and 1000 μm.

The thickness of each of insulating layers is between 1 and 100 μm.

The pitch of each of helical fiber samples D is between 0.01 and 10 mm.

The melting-drawing process is an optical fiber drawing tower drawing process, and the melting temperature is 100-300° C.

The temperature of thermal annealing may be 30° C.-200° C.

The solvent includes one or more of dichloromethane, dichloroethane, acetone, dimethylformamide or tetrahydrofuran.

The application has the following beneficial effects.

Firstly, compared with the existing artificial muscle fiber, which is capable of only realizing a single active actuation mode (only a single active elongation or a single active contraction), the artificial muscle fiber disclosed by the application is capable of realizing two actuation modes of active elongation and active contraction by applying electric field changes, thus greatly broadening the application range of the artificial muscle fiber and improving the actuation effect.

Secondly, compared with the existing electrically-actuated artificial muscle fiber in the form of linear fiber, the helical artificial muscle fiber disclosed by the application has greater actuation strain and more stable and accurate actuation action.

Thirdly, compared with the existing artificial muscle fiber devices, the artificial muscle fiber disclosed by the application has the characteristics of electrical self-healing through packaging, which greatly improves the stability, is not prone to high-voltage breakdown failure, and is suitable for humanoid robots, intelligent prostheses and other applications.

Lastly, compared with the existing heat-actuated twisted polymer artificial muscle fiber, the electrically-actuated artificial muscle fiber disclosed by the application has higher response frequency.

DETAILED DESCRIPTION OF THE EMBODIMENTS

A number of exemplary embodiments of the present application will now be described in detail. This detailed description should not be considered as a limitation of the present application, but should be understood as a more detailed description of some aspects, characteristics and embodiments of the present application. It should be understood that the terms described in the present application are only for describing specific embodiments and are not used to limit the present application.

For the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges may be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein may also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present application without departing from the essence, scope or spirit of the present application. Other embodiments will be apparent to the skilled person from the description of the application. The description and example of that present application are exemplary only.

The terms "having", "including", "possessing" and "containing" used in this article are all open terms, which means including but not limited to.

The present application will be further described with reference to specific embodiments, but the present application is not limited to the following embodiments.

Figure 1:
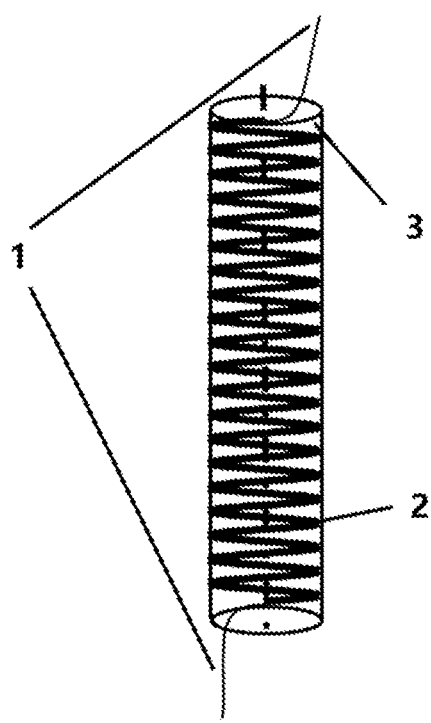
FIG. 1 is a schematic structural diagram of an artificial muscle fiber of the present application.
Figure 2:
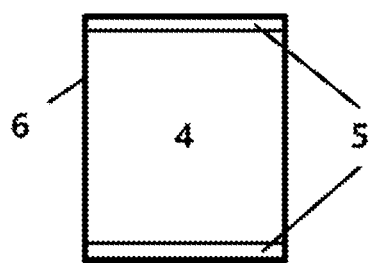
FIG. 2 is a schematic cross-sectional view of an artificial muscle fiber of the present application.
Figure 3:
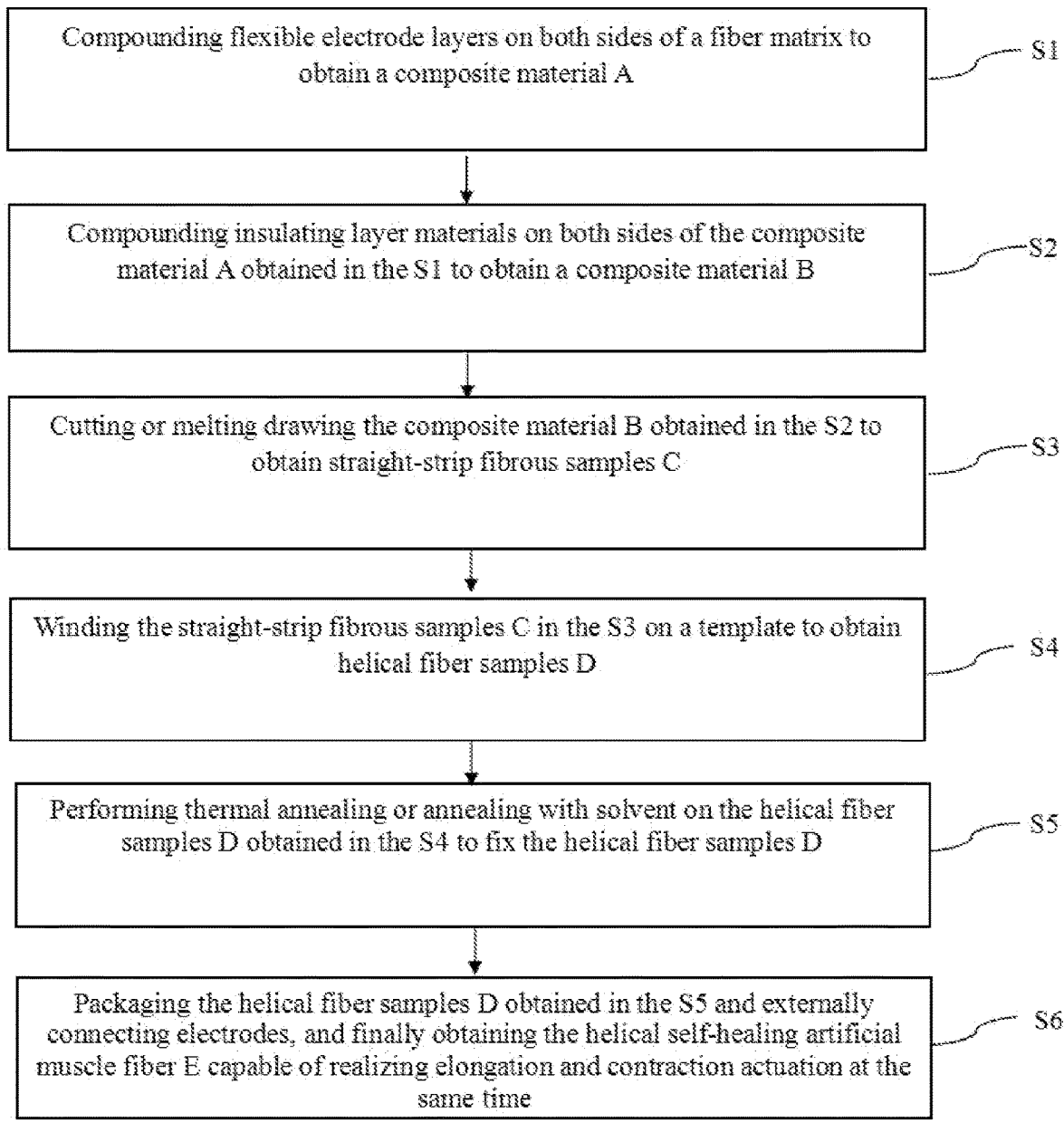
FIG. 3 is a process of a preparation method of an electrically-actuated artificial muscle fiber with bidirectional linear strain of the present application.

As shown in FIG. 3, a preparation method of an electrically-actuated artificial muscle fiber with bidirectional linear strain provided by the present application including following steps:
  S1, compounding flexible electrode layers on both sides of a fiber matrix to obtain a composite material A;
  S2, compounding insulating layer materials on both sides of the composite material A obtained in the S1 to obtain a composite material B;
  S3, cutting or melting-drawing the composite material B obtained in the S2 to obtain straight-strip fibrous samples C;
  S4, winding the straight-strip fibrous samples C in the S3 on a template to obtain helical fiber samples D;
  S5, performing thermal annealing or annealing with solvent on the helical fiber samples D obtained in the S4 to fix the helical fiber samples D; and
  S6, packaging the helical fiber samples D obtained in the S5 and externally connecting electrodes, and finally obtaining the helical self-healing artificial muscle fiber E capable of realizing elongation and contraction actuation at the same time.

The Young's modulus of the fiber matrix material is between 0.1 MPa and 10 GPa. The thickness of each of electrode layers is between 0.01 and 1000 μm.

The thickness of each of insulating layers is between 1 and 100 μm.

The cutting mode may be laser cutting or knife cutting.

The melting-drawing process is an optical fiber drawing tower drawing process, and the melting temperature is 100-300° C.

The width of fiber matrix for straight-strip fiber samples C is preferably 0.01 mm-100 mm, and the length of fiber matrix for straight-strip fiber samples C is preferably 10-100,000 cm.

The pitch of each of helical fiber samples D may be 0.01-10 mm.

The deflection angle of each of helical fiber samples D may be 0-90°.

The temperature of thermal annealing may be 30° C.-200° C.

The solvent should be selected to have good solubility for the fiber sample in the previous step.

The solvent includes but is not limited to one or more of dichloromethane, dichloroethane, acetone, dimethylformamide or tetrahydrofuran.

The device length of helical fiber sample E is 0.1-1000 cm.

The packaging structure may be filled with but not limited to transformer oil, castor oil, rapeseed oil, hydrogel, oil gel, etc. When the transformer oil, castor oil and rapeseed oil are used for packaging, cladding such as thermoplastic elastomer film, silicone rubber film and natural rubber film is used to prevent liquid leakage.

Dielectric fluid is a liquid with high insulation, high breakdown strength and low viscosity, including but not limited to transformer oil, castor oil or rapeseed oil.

The liquid content of hydrogel or oil gel is 1.0%-99.9%.

Plasma sputtering treatment may be carried out on the composite fiber before compounding the electrode layers or the insulating layers, so that the fiber surface has enough hydrophilicity with the precursors of flexible electrode layers or the insulating layers.

Embodiment 1

In this embodiment, polyvinylidene fluoride is used as the skeleton material of fiber matrix, conductive silver paste is used as the flexible electrode layer material on the upper and lower sides, polyvinylidene fluoride is used as the insulating layer materials, and transformer oil is used as the dielectric fluid packaging material to prepare the electrically-actuated helical artificial muscle fiber. The preparation of the electrically-actuated helical artificial muscle fiber specifically includes the following steps:

S1, after the conductive silver paste is fully stirred, a film with a thickness of 50 microns is evenly spread on one length×width side of a polyvinylidene fluoride plastic plate (with a thickness of 0.5 mm, a width of 3 cm and a length of 50 cm) by a scraper, and then the film is put into a vacuum oven for curing at a temperature of 130° ° C. for 0.5-2 hours, preferably curing for 1 hour and then it is taken out; a film with a thickness of 50 microns is evenly spread on the other length×width side of a polyvinylidene fluoride plastic plate, and then the film is put into a vacuum oven again for curing at a temperature of 130° ° C. for 0.5-2 hours, preferably curing for 1 hour; finally a sheet-like sample with silver electrode layers on both sides is obtained.

S2, one end of the sheet-like sample with silver electrode layers on both sides obtained in S1 is fixed on the fixture of the dip coater, and the sheet-like sample is ensured to be in a vertical state. 12 wt % solution of insulating material polyvinylidene fluoride (PVDF) is placed in a glass container and placed vertically under the plastic plate. At this time, the dip coater is started to immerse the plastic plate in PVDF solution. Then the plastic plate is pulled up at a uniform speed until the lower end of the plastic plate is completely separated from the solution. The above state is kept until no liquid drops. Then the plastic plate is dried in an oven at 70° ° C. for 2 hours, and a sheet-like sample covered with the insulating layers is obtained.

S3, the sheet-like sample covered with insulating layers obtained in S2 is cut by laser to obtain fibrous samples with widths of 0.2 millimeter.

S4, a stainless-steel cylinder with a diameter of 2 millimeters is used as a template, the fibrous samples obtained in S3 are wound and both ends of the fibrous samples are fixed.

A copper wire with a diameter of 100 microns is used as a template to adjust the pitch.

S5, the whole fibrous sample fixed on the stainless-steel template obtained in S4 is put into an oven at 120°C for annealing for 2 hours to fix the helical shape and obtain a helical fiber body.

S6, electrode leads with lengths of 10 cm are connected to the upper and lower sides of electrodes by copper wires, and then connected to the alligator clamp of plateau power supply, and the helical fiber body is packed in transformer oil gel for actuation test.

Embodiment 2

In this embodiment, thermoplastic elastomer is used as the fiber matrix skeleton material, a silver nanowire is used as the flexible electrode layer material on upper and lower sides, polyvinylidene fluoride is used as the insulating layer materials, and transformer oil is used as the dielectric fluid packaging material to prepare the electrically-actuated helical artificial muscle fiber. The preparation of the electrically-actuated helical artificial muscle fiber specifically includes the following steps:

S1, after the ethanol solution of the silver nanowire is fully stirred, a film with a thickness of 50 microns is evenly spread on one side of the thermoplastic elastomer (with a thickness 0.5 mm, width of 1 cm, length of 20 cm) with a scraper, and then the thermoplastic elastomer is put in a vacuum oven for curing at 130° C. for 2 hours and then take out. A film with a thickness of 50 microns is evenly spread on the other layer of thermoplastic elastomer sheet with a scraper, and then the thermoplastic elastomer sheet is put into the vacuum oven again for curing at a temperature of 130° C. for 2 hours, and then taken out. Finally, a sheet-like sample with silver electrode layers on both sides is obtained.

S2, one end of the sheet-like sample with silver electrode layers on both sides obtained in S1 is fixed on the fixture of the dip coater, and sheet-like sample is ensured to be in a vertical state. A solution of insulating material PVDF with a concentration of 10 wt % is placed in a glass container and placed vertically below the sheet-like sample. At this time, the dip coater is started to immerse the plastic plate in PVDF solution, and then the plastic plate is pulled up at a uniform speed until the lower end of the plastic plate is completely separated from the solution. The above state is kept until no liquid drops. Then the plastic plate is dried in an oven at 70° C. for 1 hour to obtain a sheet-like sample covered with the insulating layers.

S3, the sheet-like sample covered with insulating layers obtained in S2 is subjected to melting and drawing by an optical fiber drawing tower melting-drawing method at a melting temperature of 200° ° C. to obtain straight fibrous sample with a width of 0.5 mm.

S4, a stainless-steel cylinder with a diameter of 4 mm is used as a template, the straight fibrous sample obtained in S3 is wound, and both ends of the straight fibrous sample are fixed. A copper wire with a diameter of 200 microns is used as a template to adjust the pitch.

S5, the whole fibrous sample fixed on the stainless-steel template obtained in S4 is put into an oven at 100° C. for annealing for 2 hours to fix the helical shape and a helical fiber body is obtained.

S6, electrode leads with lengths of 10 cm are connected to the electrodes on upper and lower sides by copper wires, and then connected to the alligator clamp of plateau power supply, and the helical fiber body is packed in transformer oil for actuation test.

| | Embodiment 30-50 | | | |
|---|---|---|---|---|
| | Material of every layer | | | |
| Embodiment | Matrix skeleton | Electrode layers on upper and lower sides | Insulating layer | Packaging material |
| 1 | PVDF | Conductive silver paste | PVDF | Transformer oil |
| 2 | Thermoplastic elastomer | Silver nanowire | PVDF | Transformer oil |
| 3 | Polypropylene | Carbon nanotube | PVDF | Transformer oil |
| 4 | polyethylene | Carbon nanotube | PVDF | Transformer oil |
| 5 | Silicone rubber | Carbon nanotube | Polyimide | Transformer oil |
| 6 | Styrene-butadiene rubber | carbon nanotube | Polyimide | Transformer oil |
| 7 | Polymethyl methacrylate | Carbon nanotube | Polyimide | Transformer oil |
| 8 | Natural rubber | Carbon nanotube | Polyimide | Transformer oil |
| 9 | Polyimide | Carbon nanotube | Polyimide | Transformer oil |
| 10 | Quartz glass | Carbon nanotube | Polyimide | Transformer oil |
| 11 | PVDF | Liquid metal | Polyimide | Transformer oil |
| 12 | Thermoplastic elastomer | Liquid metal | Polyimide | Transformer oil |
| 13 | Polypropylene | Liquid metal | Polyimide | Transformer oil |
| 14 | Polyethylene | Liquid metal | Polyimide | Transformer oil |
| 15 | Silicone rubber | Liquid metal | Polyimide | Transformer oil |
| 16 | Styrene-butadiene rubber | Liquid metal | Polyimide | Transformer oil |
| 17 | Polymethyl methacrylate | Liquid metal | Polyimide | Transformer oil |
| 18 | Natural rubber | Liquid metal | Polyimide | Transformer oil |
| 19 | Polyimide | Liquid metal | Thermoplastic elastomer | Transformer oil |
| 20 | Quartz glass | Liquid metal | Thermoplastic elastomer | Transformer oil |
| 21 | PVDF | Silver nanowire | Thermoplastic elastomer | Transformer oil |
| 22 | Thermoplastic elastomer | Silver nanowire | Thermoplastic elastomer | Transformer oil |
| 23 | Polypropylene | Silver nanowire | Thermoplastic elastomer | Transformer oil |
| 24 | Polyethylene | Silver nanowire | Thermoplastic elastomer | Transformer oil |

-continued

Embodiment 30-50

Material of every layer

| Embodiment | Matrix skeleton | Electrode layers on upper and lower sides | Insulating layer | Packaging material |
|---|---|---|---|---|
| 25 | Silicone rubber | Silver nanowire | Thermoplastic elastomer | Transformer oil |
| 26 | Styrene-butadiene rubber | Silver nanowire | Thermoplastic elastomer | Transformer oil |
| 27 | Polymethyl methacrylate | Silver nanowire | Thermoplastic elastomer | Transformer oil |
| 28 | Natural rubber | Conductive silicone grease | Thermoplastic elastomer | Transformer oil |
| 29 | Polyimide | Conductive carbon grease | Thermoplastic elastomer | Transformer oil |
| 30 | Quartz glass | Copper foil | Thermoplastic elastomer | Transformer oil |
| 31 | PVDF | Conductive silver paste | PVDF | Rapeseed oil |
| 32 | Thermoplastic elastomer | Silver nanowire | PVDF | Rapeseed oil |
| 33 | Polypropylene | Carbon nanotube | PVDF | Castor oil |
| 34 | Polyethylene | Conductive carbon grease | PVDF | Castor oil |
| 35 | Silicone rubber | Liquid metal | Polyimide | Hydrogel |
| 36 | Styrene-butadiene rubber | Conductive adhesive tape | Polyimide | Transformer oil gel |

The preparation methods of embodiments 3 to 36 are similar to those of embodiment 1 and embodiment 2, but the differences are as follows:

1. If polydimethylsiloxane (PDMS) is used as the elastic silicone film material, the ratio of precursor and crosslinking agent needs to be properly adjusted (generally, it is better to use the mass ratio of precursor and crosslinking agent in the range of (5-10): 1).

2. If the interfacial polymerization method is used to compound the insulating layers, it is necessary to soak the sample in the aqueous solution of amine monomers (such as piperazine, p-phenylenediamine, m-phenylenediamine, etc.) and then soak the sample in the organic solution of trimesoyl chloride for reaction; or it is necessary to soak the sample. in the organic solution of trimesoyl chloride for reaction and then soak the sample in the aqueous solution of amine monomers (such as piperazine, p-phenylenediamine, m-phenylenediamine, etc.)

3. When the silver nanowire, the copper nanowires and the carbon nanotubes are used as flexible electrode materials, these raw materials need to be dispersed in a specific solvent (generally water, ethanol or ethylene glycol). After dip coating, drying in in an oven at a certain temperature is necessary.

4. The helical fiber devices wound in different embodiments have different pitches and diameters.

5. The applied voltages and combinations are different in different embodiments.

Effect Verification

According to the test, when the artificial muscle fiber prepared in embodiment 1 is actuated to contract by voltage, the contraction strain reaches 20% when the electrodes on upper and lower sides are applied with +5 KV and grounded respectively, and the contraction strain reaches 30% when the electrodes on both sides are applied with +20 KV and grounded respectively. If the absolute value of voltage is continuously increased, the contraction strain is almost still 30%, and the contraction strain are 28%, 30% and 30% respectively when the electrodes on both sides are applied with +5 KV and −5 KV, +10 KV and −10 KV, and +20 KV and −20 KV respectively. The elongation strain reaches 7% when the electrodes on upper and lower sides are both applied with +3 KV, and elongation strain reaches 12% when the electrodes on both sides are both applied with +20 KV (or both −20 KV). If the absolute value of voltage is continuously increased, the elongation strain increases very little. Considered comprehensively, the voltage range of −20 KV to +20 KV is preferred.

Under the actuation contraction strain of 30%, the artificial muscle fiber is repeatedly actuated for 100,000 times at the frequency of 20 Hz, and the strain change of the device is within 1%, and the actuation performance is not degraded significantly.

According to the test, when the artificial muscle fiber prepared in embodiment 2 is actuated by voltage to contract, the contraction strain reaches 30% when the electrodes on upper and lower sides are applied with +5 KV and grounded (or −5 KV and grounded) respectively, and the contraction strain reaches 40% when the electrodes on both sides are applied with +20 KV and grounded (−20 KV and grounded) respectively. If the electrode on one side is grounded and the electrode on other side is applied with voltage whose absolute value is continued to be increased, the contraction strain is almost still 40%. The elongation strains are 37%, 40% and 40% respectively when electrodes on both sides are applied with +5 KV and −5 KV, +10 KV and −10 KV, and +20 KV and −20 KV respectively. The elongation strain reaches 12% when the electrodes on upper and lower sides are both applied with +3 KV (or both applied with −3 KV), and the elongation strain reaches 20% when the electrodes on both sides are both applied with +20 KV (or both applied with −20 KV). If the absolute value of voltage is continuously increased, the elongation strain increases very little. Considered comprehensively, the voltage range of −20 KV to +20 KV is preferred.

Under the actuation contraction strain of 30%, the artificial muscle fiber is repeatedly actuated for 100,000 times at the frequency of 20 Hz, and the strain change of the device is within 0.5%, and the actuation performance is not degraded significantly. The standard deviations of phase-actuated strain of artificial muscle fibers obtained in embodiments 1 to 36 are all less than 0.08. The calculation method of standard deviation of actuation strain is shown in following formula, where the strain (elongation or contraction) measured each time is $\varepsilon_n$ (n=1, 2, 3, . . . , 100), and the average value of $\varepsilon n$ is $\varepsilon_a$.

$$\sigma = \frac{1}{\varepsilon_a}\sqrt{\frac{1}{100}\sum_{1}^{100}(\varepsilon_n - \varepsilon_a)^2}$$

The artificial muscle fibers prepared in the above embodiments 1 to 36 show excellent electrical self-healing ability. When a breakdown voltage is applied to the artificial muscle fibers, the breakdown area is able to quickly restore good insulation after breakdown. After 100 times of breakdown events, it is capable of still maintaining its good actuation performance (the lowest retention rates of energy density and power density are 93% and 90% respectively, and the lowest retention rate of actuation strain is 94%, and the actuation frequency is basically unchanged.

The above is only preferred embodiments of the present application, and the scope of protection of the present application is not limited to this. Within the technical scope disclosed by the present application, an equivalent replacement or change made by any person familiar with the technical field according to the technical scheme and inventive concept of the present application should be included in the scope of protection of the present application.

The above embodiments are only used to illustrate the design ideas and characteristics of the present application, and their purpose is to enable those skilled in the art to understand the contents of the present application and implement it accordingly. The protection scope of the present application is not limited to the above embodiments. Therefore, all equivalent changes or modifications made according to the principles and design ideas disclosed in the present application are within the protection scope of the present application.

Other embodiments of the present application will be easily thought of by those skilled in the art after considering the specification and practicing the disclosure herein. This application is intended to cover any variations, uses or adaptations of this application. The variations, uses or adaptations of this application follow the general principles of this application and include common sense or common technical means in this technical field that are not disclosed in this application. The specification and embodiments are to be regarded as exemplary only.

It should be understood that this application is not limited to the precise structure described above and shown in the drawings, and various modifications and changes may be made without departing from its scope.

What is claimed is:

1. An electrically-actuated artificial muscle fiber with bidirectional linear strain, comprising leads, an electrical packaging structure, a fiber matrix, electrode layers and insulating layers, wherein the artificial muscle fiber takes the fiber matrix as a skeleton, upper and lower layers are covered with one electrode layer respectively, one insulating layer is covered on their surfaces, a helical fiber body is formed by winding, finally, the artificial muscle fiber is formed through packaging by the electrical packaging structure, wherein metal wires are taken as the leads and respectively connected to upper and lower layers of electrodes;

voltages with different signs are applied between the upper and lower layers of electrodes or one of layers of electrodes is grounded while an other layer of electrode is applied with voltages with arbitrary signs, and the artificial muscle fiber realizes active contraction actuation;

voltages with same signs are applied between the upper and lower layers of electrodes, and the artificial muscle fiber realizes active elongation actuation.

2. The electrically-actuated artificial muscle fiber with bidirectional linear strain according to claim 1, wherein the packaging is to package one or more helical fiber bodies, the helical fiber bodies are connected in series or in parallel.

3. The electrically-actuated artificial muscle fiber with bidirectional linear strain according to claim 1, wherein the packaging is to package one or more helical fiber bodies, the helical fiber bodies are connected in series and in parallel.

4. The electrically-actuated artificial muscle fiber with bidirectional linear strain according to claim 1, wherein one of dielectric fluid, hydrogel, oil gel and air is filled in the electrical packaging structure, the dielectric fluid comprises transformer oil, castor oil and rapeseed oil; when the transformer oil, the castor oil and the rapeseed oil are used for packaging, thermoplastic elastomer film, silicone rubber film and natural rubber film are used for cladding; liquid content of the hydrogel or the oil gel is 1.0%-99.9%;

a fiber matrix material and insulating layer materials both comprise one or more of polyvinylidene fluoride, polyethylene, polypropylene, polycarbonate, polymethyl methacrylate, polyamide, polyimide, natural rubber, thermoplastic elasticity, silicone rubber, styrene-butadiene rubber, glass and quartz;

the electrode layers are flexible electrodes, comprising one or more of metal nanowires, carbon nanotubes, graphene, conductive silver paste, conductive carbon grease, liquid metal, gel electrodes, copper foils, conductive adhesive tapes and metal conductive wires.

5. The electrically-actuated artificial muscle fiber with bidirectional linear strain according to claim 1, wherein the voltages range from −20 KV to +20 KV.

6. The electrically-actuated artificial muscle fiber with bidirectional linear strain according to claim 1, wherein a Young's modulus of the fiber matrix as the skeleton is between 0.1 MPa and 10 GPa;

a thickness of each of the electrode layers is between 0.01 and 1000 μm, a thickness of each of the insulating layers is between 1 and 100 μm, a pitch of each of the helical fiber bodies is between 0.01 and 10 mm.

7. A preparation method of an electrically-actuated artificial muscle fiber with bidirectional linear strain, comprising following steps:

(1) compounding electrode layers on both sides of a fiber matrix to obtain a composite material A;

(2) compounding insulating layer materials on both sides of the composite material A obtained in the step (1) to obtain a composite material B;

(3) cutting or melting-drawing the composite material B obtained in the step (2) to obtain straight-strip fibrous samples C;

(4) winding the straight-strip fibrous samples C in the step (3) on a template to obtain helical fiber samples D;

(5) performing thermal annealing or annealing with solvent on the helical fiber samples D obtained in the step (4) to fix the helical fiber samples D; and (6) packaging the helical fiber samples D obtained in the step (5) and externally connecting electrodes, and finally obtaining a helical self-healing artificial muscle fiber E capable of realizing elongation and contraction actuation at a same time.

8. The preparation method of the electrically-actuated artificial muscle fiber with bidirectional linear strain according to claim 6, wherein the packaging the helical fiber samples D obtained in the step (5) comprises internally filling one of dielectric fluid, hydrogel, oil gel and air, the dielectric fluid comprises transformer oil, castor oil and rapeseed oil; when the transformer oil, the castor oil and the rapeseed oil are used for packaging, thermoplastic elastomer film, silicone rubber film and natural rubber film are used for cladding; liquid content of the hydrogel or the oil gel is 1.0%-99.9%;

a fiber matrix material and insulating layer materials both comprise one or more of polyvinylidene fluoride, polyethylene, polypropylene, polycarbonate, polymethyl methacrylate, polyamide, polyimide, natural rubber, thermoplastic elasticity, silicone rubber, styrene-butadiene rubber, glass and quartz;

the electrode layers are flexible electrodes, comprising one or more of metal nanowires, carbon nanotubes, graphene, conductive silver paste, conductive carbon grease, liquid metal, gel electrodes, copper foils, conductive adhesive tapes and metal conductive wires.

9. The preparation method of the electrically-actuated artificial muscle fiber with bidirectional linear strain according to claim 6, wherein the electrode layers are compounded with the fiber matrix by manual coating, dipping and pulling, and inkjet printing by a circuit printer;
 each of the insulating layers is compound with and wraps corresponding one of electrode layers by interfacial polymerization, solution film scraping, hot pressing film forming and dipping and pulling;
 the packaging is to package one or more helical fiber samples D; the helical fiber samples D are connected in series or in parallel.

10. The preparation method of the electrically-actuated artificial muscle fiber with bidirectional linear strain according to claim 6, wherein the electrode layers are compounded with the fiber matrix by manual coating, dipping and pulling, and inkjet printing by a circuit printer;
 each of the insulating layers is compound with and wraps corresponding one of electrode layers by interfacial polymerization, solution film scraping, hot pressing film forming and dipping and pulling;
 the packaging is to package one or more helical fiber samples D; the helical fiber samples D are connected in series and in parallel.

11. The preparation method of the electrically-actuated artificial muscle fiber with bidirectional linear strain according to claim 6, wherein voltages of the artificial muscle fiber E range from −20 KV to +20 KV.

12. The preparation method of the electrically-actuated artificial muscle fiber with bidirectional linear strain according to claim 6, wherein a Young's modulus of the fiber matrix material is between 0.1 MPa and 10 GPa;
 a thickness of each of the electrode layers is between 0.01 and 1000 μm;
 a thickness of each of the insulating layer is between 1 and 100 μm;
 a pitch of each of the helical fiber samples D is between 0.01 and 10 mm;
 the melting-drawing process is an optical fiber drawing tower drawing process, and a melting temperature is 100-300° C.;
 a temperature of the thermal annealing is 30° ° C.-200° ° C.;
 the solvent comprises one or more of dichloromethane, dichloroethane, acetone, dimethylformamide or tetrahydrofuran.

* * * * *